(12) United States Patent
Kang et al.

(10) Patent No.: US 7,848,295 B2
(45) Date of Patent: Dec. 7, 2010

(54) SYSTEM AND METHOD FOR MANAGING A BAND AMC SUBCHANNEL IN AN ORTHOGONAL FREQUENCY DIVISION MULTIPLE ACCESS COMMUNICATION SYSTEM

(75) Inventors: Hyun-Jeong Kang, Seoul (KR);
Seung-Eun Hong, Suwon-si (KR);
Hyon-Goo Kang, Suwon-si (KR);
Hong-Sung Chang, Suwon-si (KR);
Jung-Shin Park, Seoul (KR);
Chang-Hoi Koo, Seongnam-si (KR);
Geun-Hwi Lim, Seongnam-si (KR);
Sung-Jin Lee, Suwon-si (KR); So-Hyun Kim, Suwon-si (KR); Yeong-Moon Son, Anyang-si (KR); Hyoung-Kyu Lim, Seoul (KR); Jae-Jeong Shim, Seoul (KR); Jung-Je Son, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 676 days.

(21) Appl. No.: 11/078,091

(22) Filed: Mar. 11, 2005

(65) Prior Publication Data

US 2005/0201309 A1 Sep. 15, 2005

(30) Foreign Application Priority Data

Mar. 12, 2004 (KR) ...................... 10-2004-0017089

(51) Int. Cl.
*H04W 4/00* (2009.01)
(52) U.S. Cl. .................. 370/332; 370/329; 370/330; 370/431; 455/450; 455/452.2

(58) Field of Classification Search ...... 455/450–452.2, 455/512; 370/329, 330, 332, 333, 334, 431
See application file for complete search history.

(56) References Cited

U.S. PATENT DOCUMENTS 5,726,978 A * 3/1998 Frodigh et al. .............. 370/252

(Continued)

FOREIGN PATENT DOCUMENTS

EP 1 447 933 8/2004

(Continued)

OTHER PUBLICATIONS

Inseok Hwang et al: "A New Frame Structure for Scalable OFDMA Systems", IEEE C802.16D-04/19, XP 002498776, Mar. 11, 2004.

*Primary Examiner*—Lester Kincaid
*Assistant Examiner*—Mehmood B Khan
(74) *Attorney, Agent, or Firm*—The Farrell Law Firm, LLP

(57) ABSTRACT

A method for allocating a band Adaptive Modulation and Coding (AMC) channel in a wireless communication system that divides a full frequency band into a plurality of subcarrier bands and includes subchannels, each of which is a set of a predetermined number of neighbor subcarrier bands. Upon recognizing a need for a band AMC channel, a subscriber station (SS) sends a request for allocation of the band AMC channel to a base station (BS). Upon receiving the band AMC channel allocation request, the BS determines if it can allocate the band AMC channel requested by the SS, considering a resource situation of the BS, and transmits information on the determination to the SS.

15 Claims, 7 Drawing Sheets

U.S. PATENT DOCUMENTS

| | | |
|---|---|---|
| 6,400,699 B1 * | 6/2002 | Airy et al. .................. 370/329 |
| 6,865,393 B1 * | 3/2005 | Baum et al. .............. 455/452.2 |
| 2003/0021245 A1 | 1/2003 | Haumonte et al. |
| 2003/0123559 A1 | 7/2003 | Classon et al. |
| 2004/0066754 A1 | 4/2004 | Hottinen |
| 2004/0125743 A1 * | 7/2004 | Hashem et al. ............. 370/208 |
| 2005/0096061 A1 * | 5/2005 | Ji et al. ....................... 455/450 |
| 2005/0289256 A1 * | 12/2005 | Cudak et al. ................. 710/62 |
| 2006/0120473 A1 * | 6/2006 | Baum ......................... 375/260 |
| 2006/0246916 A1 * | 11/2006 | Cheng et al. ................ 455/450 |
| 2007/0202904 A1 * | 8/2007 | Cheng et al. ................ 455/509 |

FOREIGN PATENT DOCUMENTS

| | | |
|---|---|---|
| JP | 2002-16577 | 1/2002 |
| JP | 2002-320262 | 10/2002 |
| JP | 2003-87191 | 3/2003 |
| JP | 2003-324382 | 11/2003 |
| JP | 2003-338851 | 11/2003 |
| JP | 2005-518139 | 6/2005 |
| JP | 2005-518141 | 6/2005 |
| RU | 2 138 926 | 9/1999 |
| RU | 2 231 227 | 4/2001 |
| WO | WO 02/49305 | 6/2002 |
| WO | WO 03/019838 | 3/2003 |
| WO | WO 03/069818 | 8/2003 |
| WO | WO 03/069824 | 8/2003 |

* cited by examiner

SYSTEM AND METHOD FOR MANAGING A BAND AMC SUBCHANNEL IN AN ORTHOGONAL FREQUENCY DIVISION MULTIPLE ACCESS COMMUNICATION SYSTEM

PRIORITY

This application claims priority under 35 U.S.C. §119 to an application entitled "System and Method for Managing Band AMC Subchannel in an Orthogonal Frequency Division Multiple Access Communication System" filed in the Korean Intellectual Property Office on Mar. 12, 2004 and assigned Serial No. 2004-17089, the contents of which are incorporated herein by reference.

BACKGROUND OF THE INVENTION

1. Field of the Invention

The present invention relates generally to an Orthogonal Frequency Division Multiple Access (OFDMA) communication system, and in particular, to a system and method for managing a band AMC (Adaptive Modulation and Coding) channel in a communication system using a Time Division Duplex (TDD)-based OFDMA scheme (hereinafter referred to as a "TDD-OFDMA communication system").

2. Description of the Related Art

Research into a $4^{th}$ generation (4G) communication system, which is the next generation communication system, is currently being conducted to provide users with differing services having various Qualities of Service (QoSs) and supporting a data rate of about 100 Mbps. Compared with the 4G communication system, a $3^{rd}$ generation (3G) communication system generally supports a data rate of about 384 Kbps in an outdoor channel environment having poorer channel conditions, and supports a data rate of a maximum of 2 Mbps in an indoor channel environment having better channel conditions.

A wireless Local Area Network (LAN) system and a wireless Metropolitan Area Network (MAN) system generally support a data rate of 20 to 50 Mbps. Currently, therefore, active research into the 4G communication system is being carried out to develop a new communication system guaranteeing mobility and QoS in the wireless LAN system, and in order to develop the wireless MAN system guaranteeing a higher data rate, in order to support a high-speed service provided in the 4G communication system.

Accordingly, a great deal of research is being conducted on an Orthogonal Frequency Division Multiplexing (OFDM) scheme for high-speed data transmission through wired/wireless channels in the 4G communication system. The OFDM scheme is to a scheme of transmitting data using multiple carriers, and is a kind of a Multi-Carrier Modulation (MCM) scheme, which parallel-converts a serial input symbol stream into parallel symbols and modulates the parallel symbols with a plurality of orthogonal subcarriers, i.e., a plurality of subcarrier channels, before transmission.

A multiple access scheme based on the OFDM scheme is the OFDMA scheme. In the OFDMA scheme, subcarriers in one OFDM symbol are divided for a plurality of users, i.e., subscriber stations (SSs). Communication systems using the OFDM/OFDMA scheme include an Institute of Electrical and Electronics Engineers (IEEE) 802.16a communication system, an IEEE 802.16d communication system, and an IEEE 802.16e communication system. The IEEE 802.16d communication system is a system to which the OFDMA scheme is applied to support a broadband transmission network to a physical channel for the wireless MAN system. Further, the IEEE 802.16d communication system is a Broadband Wireless Access (BWA) communication system using a TDD-OFDMA scheme. Therefore, the IEEE 802.16d communication system, in which the OFDM/OFDMA scheme is applied to the wireless MAN system, transmits a physical channel signal using a plurality of subcarriers, thereby enabling high-speed, high-quality data transmission.

FIG. 1 is a diagram schematically illustrating a frame structure used in a conventional TDD-OFDMA communication system. Referring to FIG. 1, a frame used in the TDD-OFDMA scheme is divided into a downlink (DL) interval 149 and an uplink (UL) interval 153. A Transmit/receive Transition Gap (TTG) 151 is formed in an interval where transition occurs from the DL 149 to the UL 153, as a guard time, and a Receive/transmit Transition Gap (RTG) is formed in an interval where transition occurs from the UL 153 back to the DL 149, as a guard time. The TDD-OFDMA frame has a vertical axis including a plurality of subchannels 147 and a horizontal axis including a plurality of OFDMA symbols 145.

Describing the DL 149, a preamble 111 for synchronization acquisition is located in a $k^{th}$ OFDMA symbol, and broadcast data information that SSs will receive in common, such as a frame control header (FCH) 113, DL-MAP 115, and UL-MAP 117, is located in a $(K+1)^{th}$ or $(K+2)^{th}$ OFDMA symbol. The FCH 113 includes two subchannels, and transmits basic information on subchannels, i.e., raging and modulation schemes. DL bursts 121, 123, 125, 127, and 129 are located between the $(K+2)^{th}$ OFMDA symbol exclusive of a UL-MAP 119 and a $(K+8)^{th}$ OFDMA symbol.

Describing the UL 153, preambles 131, 133, and 135 are located in a $(K+9)^{th}$ OFDMA symbol, and UL bursts 137, 139, and 141 are located between a $(K+10)^{th}$ OFDMA symbol and a $(K+12)^{th}$ OFDMA symbol. In addition, a ranging subchannel 143 is located between the $(K+9)^{th}$ OFDMA symbol and the $(K+12)^{th}$ OFDMA symbol.

Information on positions and allocation of the UL bursts 137, 139, and 141 and the DL bursts 121, 123, 125, 127, and 129 is provided from a base station (BS) controlling a particular cell to SSs, which are located in the cell, through the DL-MAP 115 and the UL-MAP 117. The SSs are variably allocated subchannels, each of which a combination of frequencies and symbols, through the information every frame, and perform communication using the allocated subchannels. That is, the SSs can use different subchannels every frame, instead of fixed subchannels. Also, in a neighbor cell, SSs perform communication using the same frequency band. Therefore, for an SS located in a cell boundary, if different cells use the same subchannels, the subchannels may significantly interfere with each other.

As described above, the conventional OFDMA communication system performs data communication with SSs regardless of channel states. That is, a scheme that enables SSs having good channel states to perform high-speed, high-capacity communication is not presented in the frame structure for the conventional OFDMA communication system. Therefore, the conventional technology cannot perform a flexible modulation and coding method for the SSs having high subchannel quality.

SUMMARY OF THE INVENTION

It is, therefore, an object of the present invention to provide a system and method for performing high-speed, high-capacity communication in a Broadband Wireless Access communication system.

It is another object of the present invention to provide a band AMC channel allocation method for providing a high data rate to SSs having low mobility in a TDD-OFDMA communication system.

It is further another object of the present invention to provide a system and method for managing band AMC subchannels in a TDD-OFDMA communication system.

It is yet another object of the present invention to provide a BS and SS management scheme for enabling high-speed, high-capacity data transmission through a band AMC channel state report in a TDD-OFDMA communication system.

It is still another object of the present invention to provide a BS and SS management scheme for releasing band AMC channels in a TDD-OFDMA communication system.

It is still another object of the present invention to provide a system and method for allocating band AMC subchannels such that based on channel states of SSs, wherein a BS enables SSs having a good channel state to enable high-speed, high-capacity data transmission, in a TDD-OFDMA communication system.

It is still another object of the present invention to provide a new frame structure for enabling high-speed, high-capacity data transmission according to channel states in a TDD-OFDMA communication system.

It is still another object of the present invention to provide a system and method for enabling high-speed, high-capacity data transmission by applying high-efficiency modulation and coding schemes to SSs having high channel quality through band AMC subchannels and their associated messages.

In accordance with one aspect of the present invention, there is provided a method for requesting allocation of a band Adaptive Modulation and Coding (AMC) channel by a subscriber station (SS), in a wireless communication system that divides a full frequency band into a plurality of subcarrier bands, each of which is a set of a predetermined number of subbands, each of which is a set of a predetermined number of contiguous subcarriers. The method comprises the steps of recognizing a need for use of a band AMC channel; measuring reception quality of bands; making a list of bands having high reception quality according to the reception quality measurements; sending a request for allocation of the band AMC channel to a base station (BS); receiving a response to the request from the BS; and transitioning to a state in which the SS uses a band AMC channel, according to the response.

In accordance with another aspect of the present invention, there is provided a method for allocating a band Adaptive Modulation and Coding (AMC) channel by a base station (BS), in a wireless communication system that divides a full frequency band into a plurality of subcarrier bands, each of which is a set of a predetermined number of subbands, each of which is a set of a predetermined number of contiguous subcarriers, the method comprising the steps of: receiving a band AMC channel request from a predetermined subscriber station (SS) in a state in which the BS does not use a band AMC channel; determining to allocate a band AMC channel to the SS in response to the request; and transmitting band AMC channel allocation information corresponding to the determination result to the SS.

In accordance with further another aspect of the present invention, there is provided a method for requesting allocation of a band Adaptive Modulation and Coding (AMC) channel by a subscriber station (SS), in a wireless communication system that divides a full frequency band into a plurality of subcarrier bands, each of which is a set of a predetermined number of subbands, each of which is a set of a predetermined number of contiguous subcarriers. The method comprises the steps of: sending a report on a state of a AMC channel to a base station (BS); receiving a response to the report on the state of the band AMC channel from the BS; and determining to use the band AMC channel according to the response.

In accordance with still another aspect of the present invention, there is provided a method for allocating a band Adaptive Modulation and Coding (AMC) channel by a base station (BS), in a wireless communication system that divides a full frequency band into a plurality of subcarrier bands, each of which is a set of a predetermined number of subbands, each of which is a set of a predetermined number of contiguous subcarriers. The method comprises the steps of: receiving band AMC channel information from a subscriber station (SS); and determining to allocate a band AMC channel according to the received channel information.

In accordance with still another aspect of the present invention, there is provided a method for transmitting data through a channel set up between a subscriber station (SS) and a base station (BS), in a wireless communication system that divides a full frequency band into a plurality of subcarrier bands, each of which is a set of a predetermined number of subbands, each of which is a set of a predetermined number of contiguous subcarriers. The method comprises the steps of detecting a change in state of a current band Adaptive Modulation and Coding (AMC) channel allocated from the BS in the SS; transmitting a channel state response (CH_STA_RSP) message to report the change to the BS; receiving the CH_STA_RSP message; determining, by the BS, if the BS can allocate a band AMC channel to the SS through the CH_STA_RSP message; transmitting a band AMC indication (BAND_AMC_IND) message including information indicating whether the BS allocates the band AMC channel to the SS; receiving the BAND_AMC_IND message; transmitting, by the SS, data to the BS using one of a diversity channel and the band AMC channel according to the received BAND_AMC_IND message.

In accordance with still another aspect of the present invention, there is provided a system for allocating a band Adaptive Modulation and Coding (AMC) channel in a wireless communication system that divides a full frequency band into a plurality of subcarrier bands, each of which is a set of a predetermined number of bands, each of which is a set of a predetermined number of contiguous subcarriers. The system comprises a subscriber station (SS) for transmitting a channel state response (CH_STA_RSP) message to request allocation of a band AMC channel for use of the band AMC channel and to transmit information on a current band AMC channel; and a base station (BS) for transmitting a channel state request (CH_STA_REQ) message to detect a state of the band AMC channel currently used by the SS, receiving the CH_STA_RSP message, and transmitting a band AMC indication (BAND_AMC_IND) message to the SS in response to the received CH_STA_RSP message.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Preferred embodiments of the present invention will now be described in detail herein below with reference to the annexed drawings. In the following description, a detailed description of known functions and configurations incorporated herein has been omitted for conciseness.

Generally, the present invention proposes a system and method for enabling a base station (BS) to transmit high-speed, high-capacity data to subscriber stations (SSs) having a good channel state in an Orthogonal Frequency Division Multiplexing (OFDM) communication system. In particular, the present invention proposes a system and method for allocating and managing band AMC (Adaptive Modulation and Coding) subchannels for enabling high-speed, high-capacity data transmission to SSs having a good channel state, according to channel states of SSs.

That is, the present invention proposes a band AMC channel allocation scheme for providing a higher data rate to users, i.e., SSs, having lower mobility, a BS and SS operation scheme according to a band AMC channel state report, and a BS and SS operation scheme for releasing band AMC channels in a TDD-OFDMA communication system.

More specifically, the present invention proposes a system and method in which an SS measures a reception signal level of each band and selects a modulation scheme having high coding efficiency through a particular band having high reception quality based on the measured reception signal level, thereby enabling high-speed data transmission/reception between a BS and an SS in a TDD-OFDMA communication system.

In addition, the present invention proposes a new TDD-OFDMA frame structure for enabling data transmission/reception according to channel states. In particular, the present invention proposes a band AMC channel and a new message according thereto, and applies high-efficiency modulation and coding schemes to SSs having high channel quality, thereby enabling high-speed, high-capacity data transmission.

Figure 1:
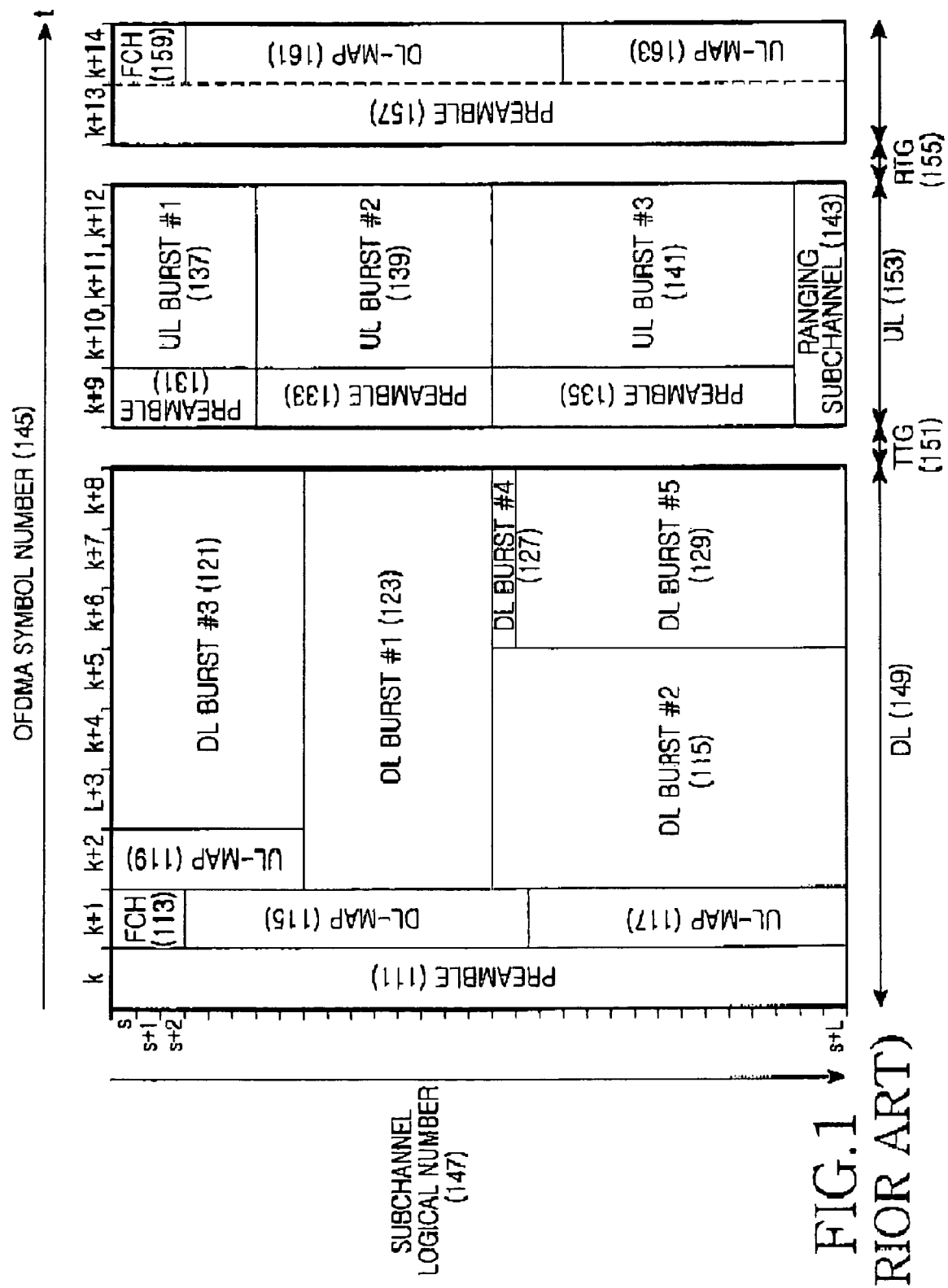
FIG. 1 is a diagram schematically illustrating a frame structure used in a conventional TDD-OFDMA communication system.
Figure 2:
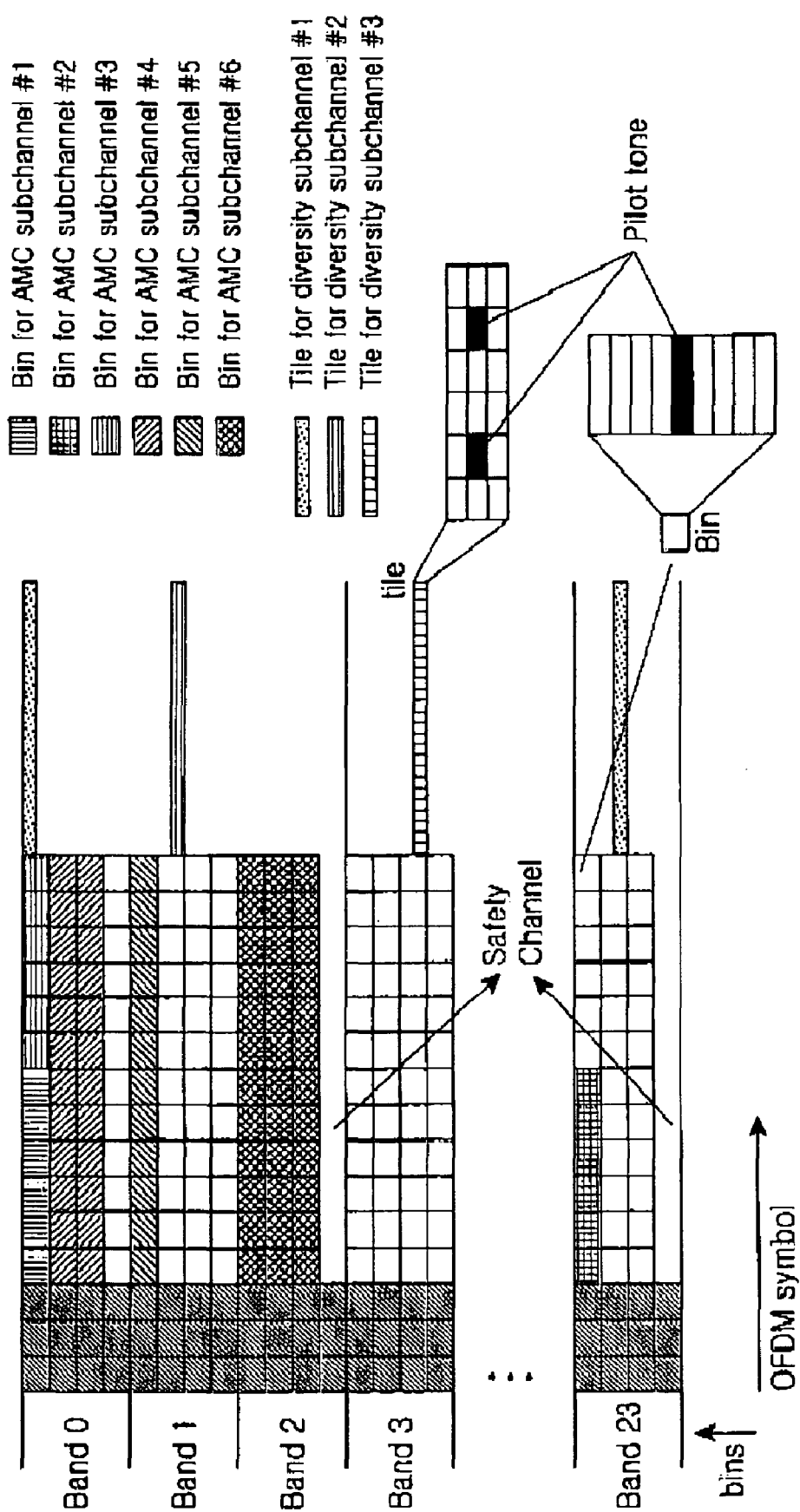
FIG. 2 is a diagram schematically illustrating a frame structure used in a TDD-OFDMA communication system according to an embodiment of the present invention.

FIG. 2 is a diagram schematically illustrating a frame structure used in a TDD-OFDMA communication system according to an embodiment of the present invention. Referring to FIG. 2, in the frame structure, a full subcarrier band is divided into a plurality of bands, for example, Band#0 to Band#23, and the band includes a plurality of bins or tiles. The bin or tile includes a plurality of subcarriers. Herein, the bin includes 9 consecutive subcarriers in one OFDM symbol, and there are 1 pilot tone and 8 data tones. The tile includes 3 to 6 consecutive subcarriers, and there are 2 pilot tones and 16 data tones.

Referring to FIG. 2, in the frame, the first three OFDM symbols are used for a ranging channel, an acknowledge (ACK) channel, and a channel quality information (CQI) channel, respectively. The other OFDM symbols are allocated for band AMC channels, diversity channels, and safety channels. Herein, the band AMC channels at the front of the frame are allocated based on a band including 6 bins, and the diversity channels at the rear of the frame are allocated based on a subchannel including three tiles spread over the full subcarrier band.

As the band AMC channels are larger than the diversity channels in terms of areas allocated therefor, i.e., when reception quality is high, the band AMC channels can be used for transmitting/receiving large-volume data at high speed by applying a modulation scheme having high coding efficiency.

For the safety channel, a part of which is laid over all OFDM symbols, one bin is allocated. The safety channel is allocated all symbols in one bin. An SS is allocated a safety channel among safety channels unused in a neighbor cell with a frequency band available in a BS, i.e., an unallocated frequency band.

Figure 3:
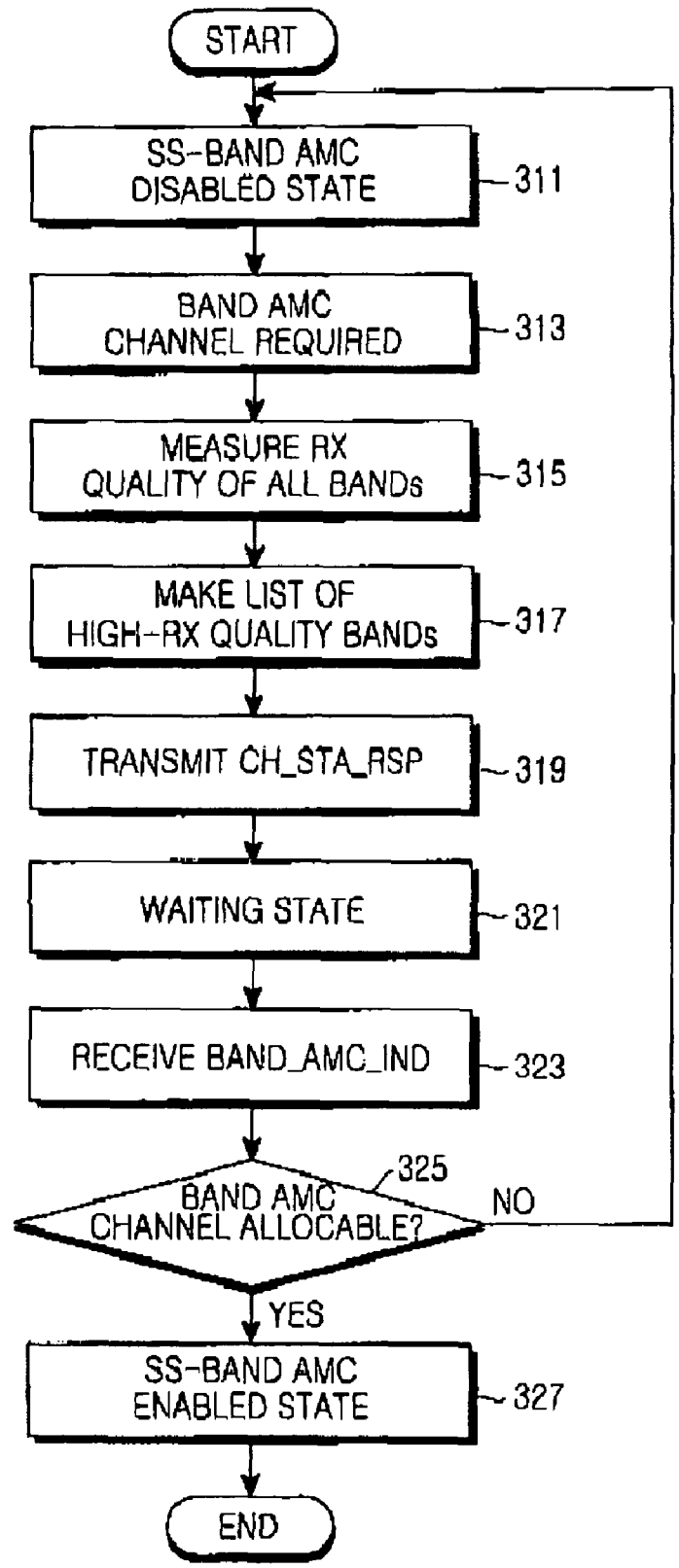
FIG. 3 is a flowchart illustrating an SS band AMC channel allocation request operation in a TDD-OFDMA communication system according to an embodiment of the present invention.

FIG. 3 is a flowchart illustrating an SS band AMC channel allocation request operation in a TDD-OFDMA communication system according to an embodiment of the present invention. Referring to FIG. 3, if an SS in a band AMC disabled state in step 311 recognizes the need for a band AMC channel in step 313, it proceeds to step 315. In step 315, the SS measures reception qualities of all bands.

In step 317, the SS compares the measured reception qualities with a reference value defined in the system, and makes a list of bands including higher reception qualities than the reference value, i.e., bands having high reception qualities. In step 319, the SS transmits a Channel State Response (CH_STA_RSP) message to a BS. The CH_STA_RSP message includes the list of bands having high reception quality, information on CQI of each band included in the list, and band AMC channel allocation request information. A format of the CH_STA_RSP message will be described later.

After transmitting the CH_STA_RSP message, the SS waits for a response from the BS in step 321. In step 323, when the SS receives a Band AMC Indication (BAND_AMC_IND) message from the BS in response to the CH_STA_RSP message, the SS proceeds to step 325. A format of the BAND_AMC_IND message will be described later.

In step 325, the SS determines if the BS can allocate a band AMC channel to the SS itself, based on the received BAND_AMC_IND message. If the SS can be allocated a band AMC channel from the BS, the SS transitions to a band AMC enabled state in step 327. However, if the SS cannot be allocated a band AMC channel from the BS, the SS returns to step 311 to repeat the foregoing process.

The CH_STA_RSP message transmitted in step 319 from the SS to the BS is used by the SS to report channel quality of a band to the BS, or request the BS for allocation of a band AMC channel. A format of the CH_STA_RSP message is shown in Table 1 below.

TABLE 1

| Syntax | Size | Notes |
|---|---|---|
| CH_STA_RSP_Message_Format( ){ | | |
| Management_Message_Type = TBD | 8 bits | |
| Reported Channel Type | 2 bits | 00 = Diversity Channel |
| | | 01 = Band AMC Channel |
| | | 10 = Safety Channel |
| | | 11 = Reserved |
| No. Reported Channels | | |
| for(i=0; j<No. Reported Channels; j++){ | | |
|   if (Reported Channel Type ==00){ | | |
|     Downlink Channel ID | 8 bits | 0~255 |
|     C/I | 5 bits | |
|   } | | |
|   if (Reported Channel Type==01){ | | |
|     Band Index | 4 bits | 0~15 |
|     C/I | 5 bits | |
|   } | | |
|   if (Reported Channel Type==10){ | | |
|     Bin Index | 7 bits | 0~127 |
|     C/I | 5 bits | |
|   } | | |
| } | | |
| C/I difference between serving cell and target cell | variable | TLV specific |
| } | | |

As shown in Table 1, the CH_STA_RSP message includes a plurality of information elements (IEs), i.e., a Management Message Type indicating a type of a transmission message, and a Reported Channel Type indicating type information of a channel, a state of which the SS will report to the BS, information on a list of channels, measured quality of each of which the SS reports to the BS, and state information of each channel included in the list.

The channel type information corresponds to a channel used when the SS communicates with the BS. For example, if the channel in use is a diversity channel, the Reported Channel Type represents a value '00'. If the channel in use is a band AMC channel, the Reported Channel Type represents a value '01'. If the channel in use is a safety channel, the Reported Channel Type represents a value '10'.

If the channel type is a diversity channel (Reported Channel Type=00), the CH_STA_RSP message includes information on a Downlink Channel ID of each diversity channel and a carrier-to-interference ratio (C/I) of the channel. If the channel type is a band AMC channel (Reported Channel Type=01), the CH_STA_RSP message includes information on each Band Index of a band AMC channel and a C/I of the band. If the channel type is a safety channel (Reported Channel Type=10), the CH_STA_RSP message includes information on a Bin ID of the safety channel and a C/I of the bin.

The BAND_AMC_IND message transmitted in step 323 from the BS to the SS is a response to the CH_STA_RSP message shown in Table 1, and is used by the BS to inform the SS of allocation/non-allocation of a band AMC channel. A format of the BAND_AMC_IND message is shown below in Table 2.

TABLE 2

| Syntax | Size | Notes |
|---|---|---|
| BAND_AMC_IND_Message_Format( ){ | | |
| Management_Message_Type = TBD | 8 bits | |
| Band AMC Indicator | 1 bit | 0 = Disable |
| | | 1 = Enable |
| } | | |

As shown in Table 2, the BAND_AMC_IND message includes a plurality of IEs, i.e., a Management Message Type indicating a type a transmission message, and a Band AMC Indicator indicating approval/disapproval for a band AMC channel allocation request transmitted from the SS to the BS. For example, if a value of the Band AMC Indicator is '1' (Enable), allocation of the band AMC channel requested by the SS is approved. If a value of the Band AMC Indicator is '0' (Disable), allocation of the band AMC channel requested by the SS is disapproved.

Figure 4:
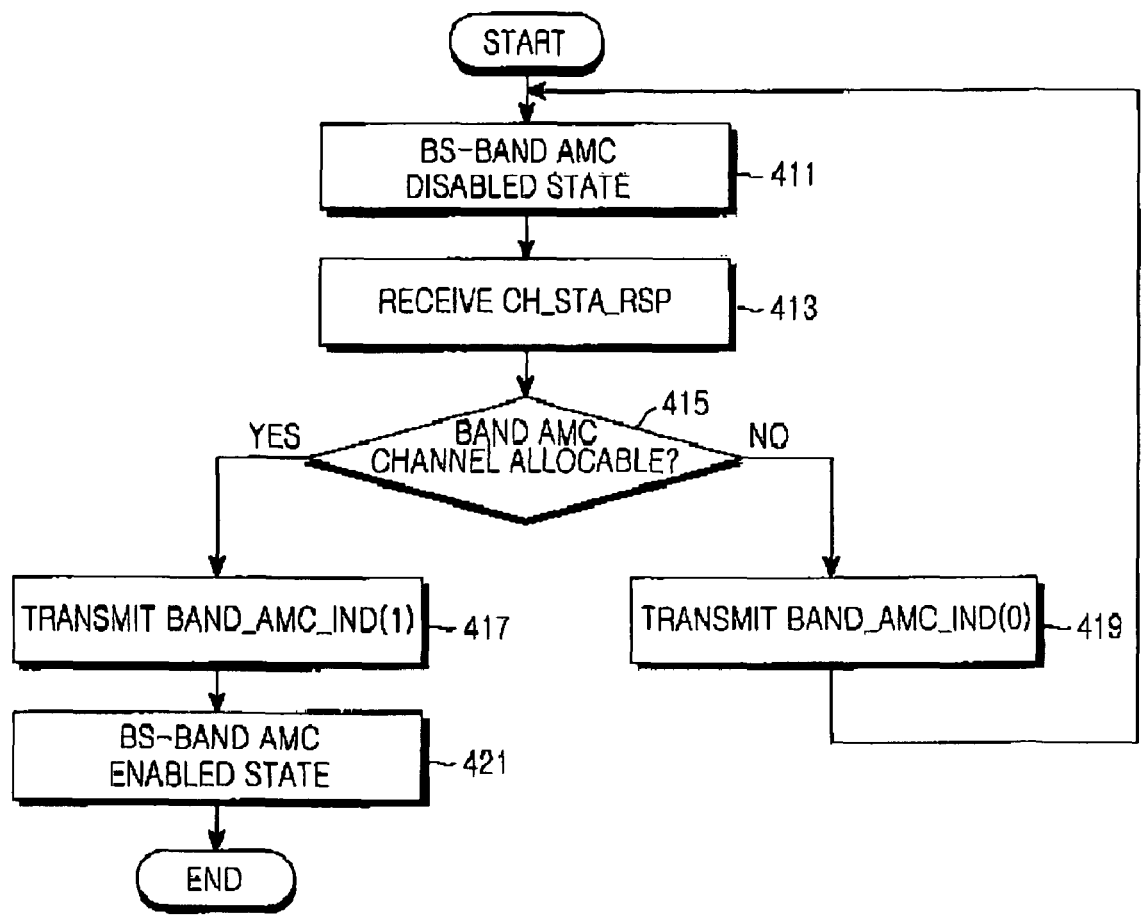
FIG. 4 is a flowchart illustrating a BS operation in response to a band AMC channel allocation request from an SS in a TDD-OFDMA communication system according to an embodiment of the present invention.

FIG. 4 is a flowchart illustrating a BS operation in response to a band AMC channel allocation request from an SS in a TDD-OFDMA communication system according to an embodiment of the present invention. Referring to FIG. 4, if a BS in a band AMC disabled state in step 411 receives a CH_STA_RSP message from an SS in step 413, the BS determines if it can allocate a band AMC channel requested by the SS in step 415, considering its resource state.

If the BS can allocate a band AMC channel to the SS, the BS transmits a BAND_AMC_IND message with Band AMC Indicator=1 (Enable), shown in Table 2, to the SS in step 417. Thereafter, in step 421, the BS transitions to a band AMC enabled state.

However, if the BS cannot allocate a band AMC channel to the SS, the BS transmits a BAND_AMC_IND message with Band AMC Indicator=0 (Disable), shown in Table 2, to the SS in step 419, and then returns to step 411 where it transitions to a band AMC disabled state.

Figure 5:
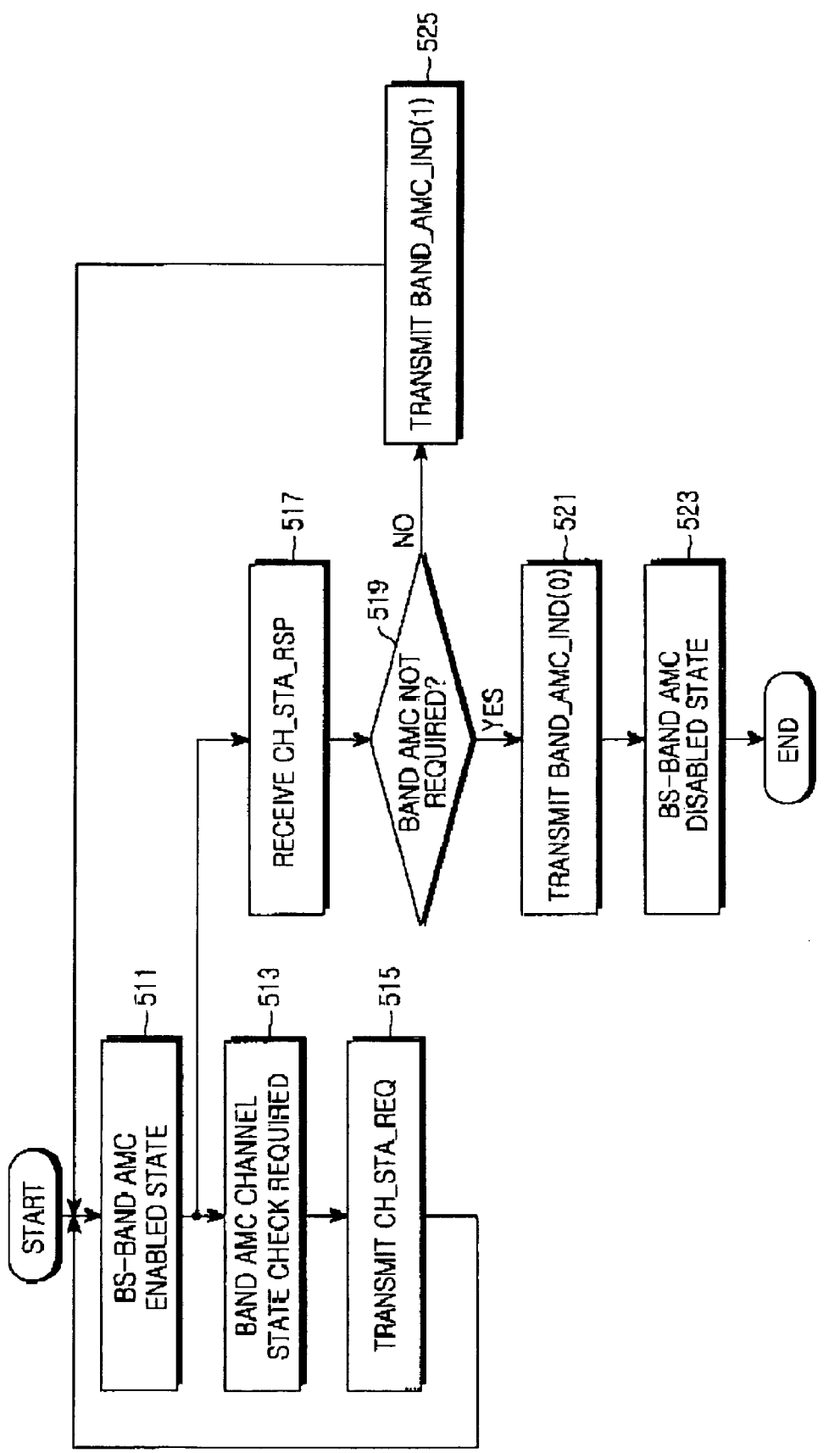
FIG. 5 is a flowchart illustrating a BS operation of receiving a report on a state of a band AMC channel from an SS in a TDD-OFDMA communication system according to an embodiment of the present invention.

FIG. 5 is a flowchart illustrating a BS operation of requesting a report on a state of a band AMC channel allocated to an SS in a TDD-OFDMA communication system according to an embodiment of the present invention. Referring to FIG. 5, if a BS in a band AMC enabled state in step 511 detects occurrence of a specific effect, for example, if the BS recognizes the need for receiving a report on a state of a band AMC channel allocated to the SS, in step 513 or if the BS receives a CH_STA_RSP message from the SS in step 517, the BS performs an operation according to the corresponding state.

In step 513, the BS recognizes the need for receiving a report on a state of a band AMC channel allocated to the SS. In step 515, the BS transmits a Channel State Request (CH_STA_REQ) message for an information report request for a state of the band AMC channel allocated to the SS, and then returns to step 511 where it stays in the band AMC enabled state. A format of the CH_STA_REQ message will be described later.

The BS recognizes the need for receiving a report on a state of a band AMC channel from the SS in step 513, for example, (1) when it is determined that the reception quality of data transmitted by the SS with a band AMC channel is low, (2) when it is determined that it is necessary to change allocation of the currently scheduled band AMC channels in the course of allocating a band AMC channel to each SS, or (3) when the BS checks a current state of a band AMC channel used by each SS and desires to perform an operation according thereto.

If the BS in the band AMC enabled state in step 511 receives, in step 517, a CH_STA_RSP message from the SS in response to the CH_STA_REQ message transmitted in step 515, the BS proceeds to step 519.

It is assumed in FIG. 5 that after transmitting a CH_STA_REQ message to the SS, the BS receives a CH_STA_RSP message in response to the CH_STA_REQ message. However, the present invention is not limited to the assumption.

For example, the CH_STA_RSP message received in step 517 can be transmitted by the SS itself upon detecting the need for reporting a state on a band AMC channel even when the BS does not transmit in step 515 the CH_STA_REQ message for requesting a report on a state of a band AMC channel to the SS. Then the BS receives the CH_STA_RSP message transmitted from the SS, and performs a procedure according to the received CH_STA_RSP message.

The SS transmits the CH_STA_RSP message in step 517, when the SS desires to determine if it can be allocated another band AMC channel because of the low quality of its current band AMC channel. The CH_STA_RSP message received in step 517, as shown in Table 1, includes quality information of the band AMC channel allocated to the SS.

After receiving a report on the state of the band AMC channel allocated to the SS through the CH_STA_RSP message received from the SS in step 517, the BS determines if a new band AMC is required from the received CH_STA_RSP message in step 519.

If the BS can no longer allocate a band AMC channel to the SS or the BS is not required to allocate a band AMC channel to the SS, the BS transmits a BAND_AMC_IND message with Band AMC Indicator=0 to the SS in step 521. Thereafter, in step 523, the BS transitions to a band AMC disabled state.

However, if it is possible to continuously allocate a band AMC channel to the SS or it is not necessary to allocate a band AMC channel to the SS, the BS transmits the BAND_AMC_IND message with Band AMC Indicator=1 to the SS in step 525, and then returns to step 511 where it stays in the band AMC enabled state.

The CH_STA_REQ message transmitted in step 515 from the BS to the SS is transmitted to request a report on a state of the band AMC channel allocated to the SS. A format of the CH_STA_REQ message is shown in Table 3 below.

TABLE 3

| Syntax | Size | Notes |
| --- | --- | --- |
| CH_STA_REQ_Message_Format( ){ | | |
| Management_Message_Type = TBD | 8 bits | |
| Requested Channel Type | 2 bits | 00 = Diversity Channel |
| | | 01 = Band AMC Channel |
| | | 10 = Safety Channel |
| | | 11 = Reserved |
| TLV Encoded Information | variable | TLV specific |
| } | | |

As shown in Table 3, the CH_STA_REQ message includes a plurality of IEs, i.e., a Management Message Type indicating a type of a transmission message, and a Requested Channel Type indicating type information of a channel, a report on a state of which the BS desires to receive from an SS.

The channel type information corresponds to a channel used when the BS communicates with the SS. For example, if the channel in use is a diversity channel, the Reported Channel Type represents a value '00'. If the channel in use is a band AMC channel, the Reported Channel Type represents a value '01'. If the channel in use is a safety channel, the Reported Channel Type represents a value '10'.

Figure 6:
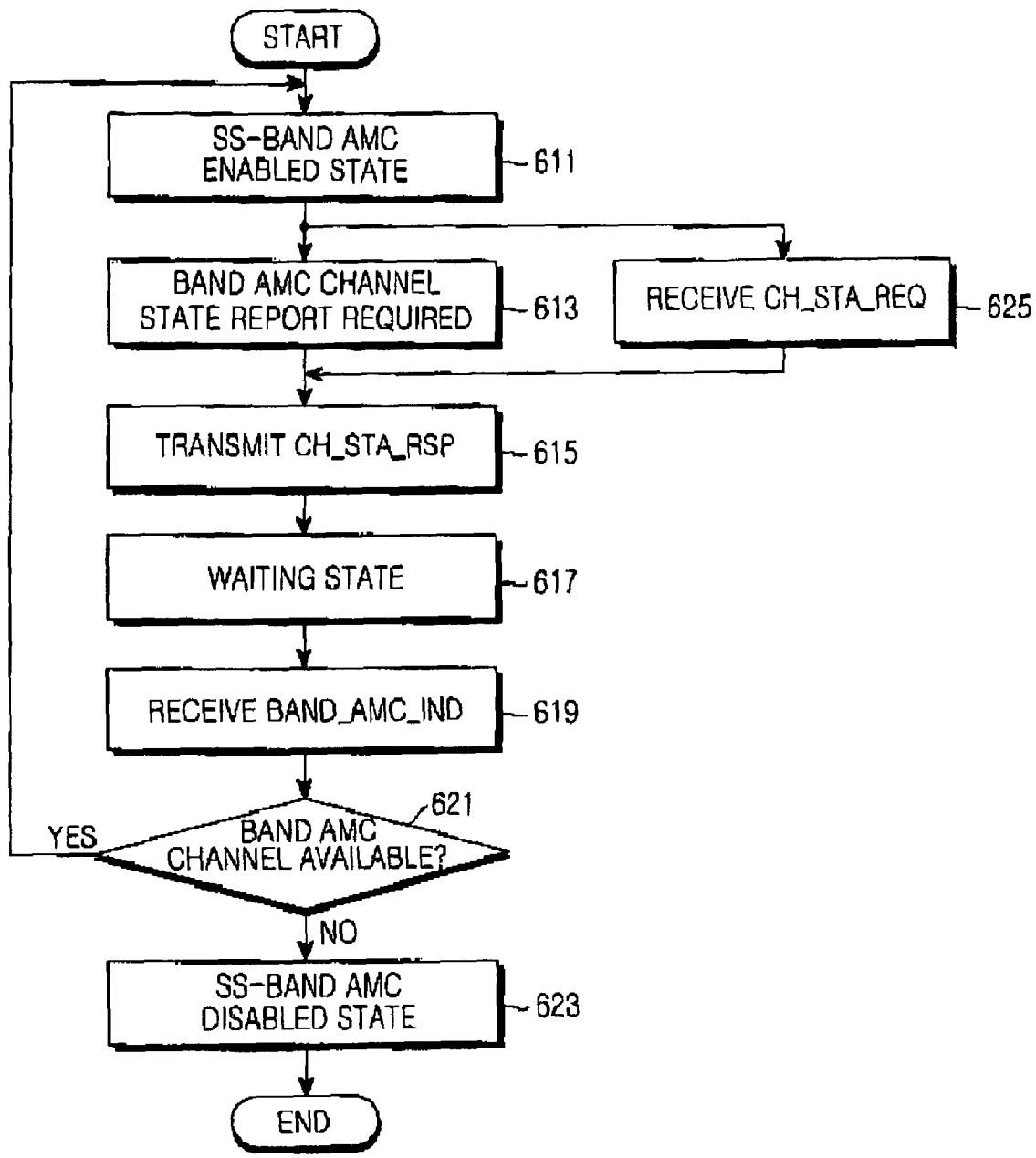
FIG. 6 is a flowchart illustrating an SS operation of transmitting a report on a state of a band AMC channel in a TDD-OFDMA communication system according to an embodiment of the present invention.

FIG. 6 is a flowchart illustrating an SS operation of reporting a state of its current band AMC channel to a BS in a TDD-OFDMA communication system according to an embodiment of the present invention. Referring to FIG. 6, if an SS in a band AMC enabled state in step 611 detects occurrence of a specific effect, for example, if the SS recognizes the need for transmitting a report on a state of a band AMC channel allocated from the BS in step 613 or if the SS receives a CH_STA_REQ message from the BS in step 625, the BS proceeds to step 615.

In step 613, the SS recognizes the need for transmitting a report on a state of the band AMC channel (1) when it is determined that the SS can no longer use a band AMC channel due to the low quality of its current band AMC channel, or (2) when the SS inquires of the BS about whether it can change its band AMC channel to anther band AMC channel.

Thereafter, in step 615, the SS transmits a CH_STA_RSP message to the BS in order to make a report on a state of its current band AMC channel.

It is assumed herein that the SS determines the need for transmitting a report on a sate of the band AMC channel. However, the present invention is not limited to the assumption. For example, upon receiving the CH_STA_REQ message for requesting a report on a state of a band AMC channel from the BS in step 625, the SS can transmit the CH_STA_RSP message in step 615 in order to make a report on a state of its current band AMC channel.

After transmitting the CH_STA_RSP message in step 615, if the SS in a waiting state in step 617 receives a BAND_AMC_IND message from the BS in step 619, the SS determines if it can use a band AMC channel in step 621, by checking a set value of a Band AMC Indicator included in the received BAND_AMC_IND message.

For example, as illustrated in Table 2, if a value of the Band AMC Indicator is '1' (Enable), it indicates that the SS can use the band AMC channel. If a value of the Band AMC Indicator is '0' (Disable), it indicates that the SS cannot use the band AMC channel.

If the SS can no longer use the band AMC channel, the SS transitions to a band AMC disabled state in step 623. However, if the SS can continue to use the band AMC channel, the SS returns to step 611, where it stays in the band AMC enabled state.

Figure 7:
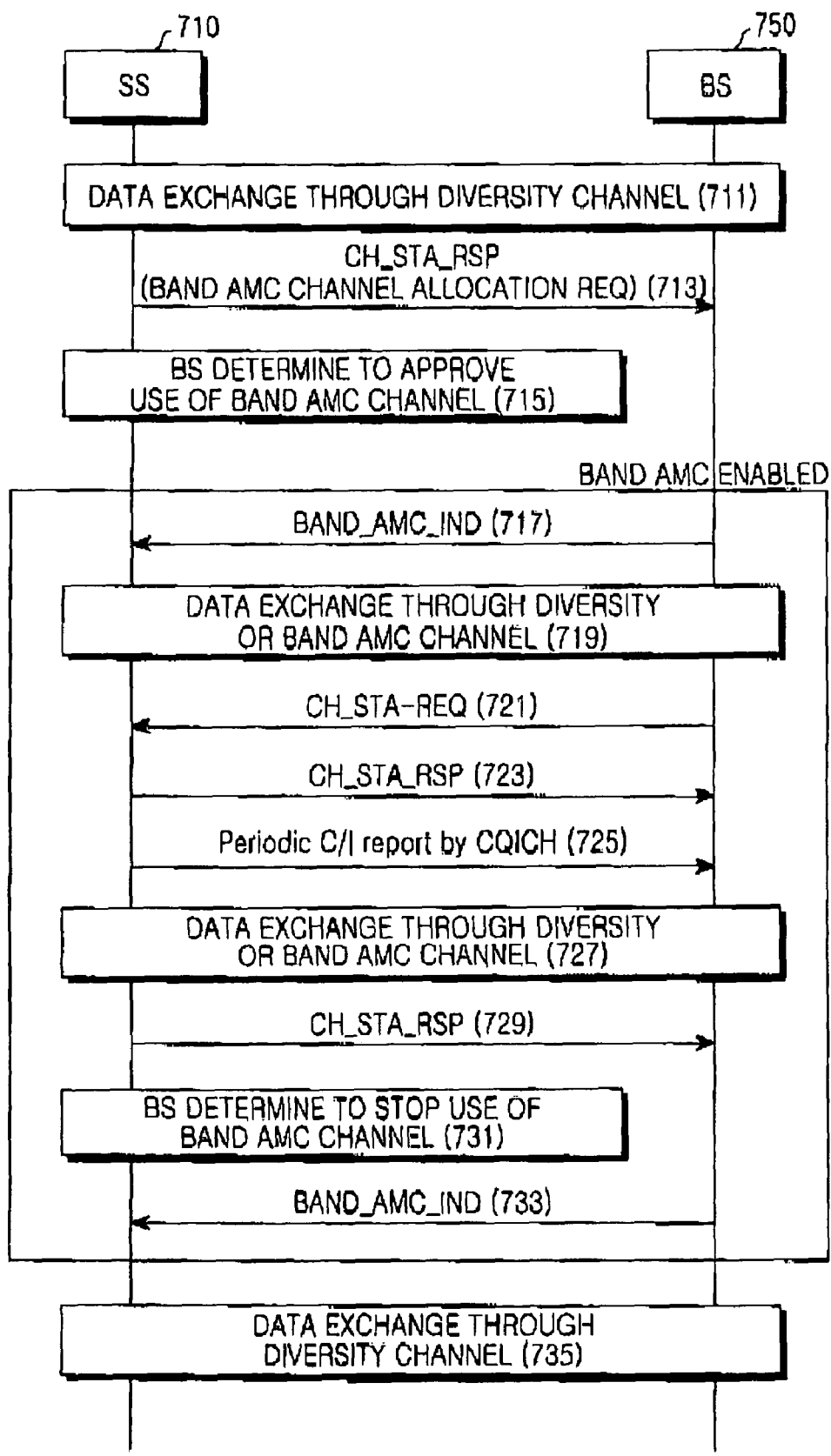
FIG. 7 is a signaling diagram illustrating a process of performing transmission/reception of band AMC channel-related messages between an SS and a BS in a TDD-OFDMA communication system according to an embodiment of the present invention.

FIG. 7 is a signaling diagram illustrating a process of setting up and releasing a band AMC channel between an SS and a BS in a TDD-OFDMA communication system according to an embodiment of the present invention. Referring to FIG. 7, an SS 710 and a BS 750 exchange data with each other, using a diversity channel in Step 711. If the SS 710 desires to use a band AMC channel, the SS 710 transmits a CH_STA_RSP message to the BS 750 to request allocation of the band AMC channel in Step 713. Thereafter, if the BS 750 determines that it can allocate a band AMC channel to the SS 710 in Step 715, the BS 750 informs the SS 710 of the possibility of allocating the band AMC channel through a BAND_AMC_IND message in Step 717.

Upon receiving the BAND_AMC_IND message from the BS 750, the SS 710 performs data transmission/reception according to information included in the BAND_AMC_IND message. Because the BAND_AMC_IND message, as described above, includes information indicating the possibility of allocating a band AMC channel to the SS 710, the SS 710 exchanges data with the BS 750 through a diversity channel or the allocated band AMC channel in Step 719.

For example, assuming that the BS 750 transmits downlink data to the SS 710 in the data transmission/reception process of step 719, if a size of the data is not large, the data can be transmitted using a diversity channel, and if a size of the data to be transmitted by the BS 750 is large, the data can be transmitted using the allocated band AMC channel. In addition, when the SS 710 transmits uplink data to the BS 750, the data can be transmitted using only the allocated band AMC channel.

In the band AMC enabled state of the SS 710, the BS 750 can transmit a CH_STA_REQ message to the SS 710 in order to receive a report on a state of the allocated band AMC channel in Step 721. The SS 710 transmits a CH_STA_RSP message including state information of its current band AMC channel to the BS 750 in response to the CH_STA_REQ message in Step 723.

Alternatively, the SS 710 can periodically report its own C/I information to the BS 750 irrespective of a request of the BS 750 in Step 725.

The BS 750 transmits a BAND_AMC_IND message to the SS 710 according to information included in the CH_STA_RSP message transmitted from the SS 710. The SS 710 receives the BAND_AMC_IND message, and exchanges data with the BS 750 through a diversity channel or a band AMC channel according to information included in the received BAND_AMC_IND message in Step 727. Whether a diversity channel or a band AMC channel is used for the data exchange between the SS 710 and the BS 750 in Step 727 is determined in the method of Step 719.

If a state of the current band AMC channel allocated from the BS 750 suffers a change, the SS 710 transmits a CH_STA_RSP message to report the change to the BS 750 in Step 729. The BS 750 receives the transmitted CH_STA_RSP message, and determines if it is necessary to allocate a band AMC channel to the SS 710, based on the received CH_STA_RSP message in Step 731. If it is determined in Step 731 that the SS 710 is no longer required to use a band AMC channel, the BS 750 transmits a BAND_AMC_IND message including information indicating that the SS 710 cannot use the band AMC channel, to instruct the SS 710 to release the band AMC channel in use in Step 733. Thereafter, in Step 735, the SS 710 exchanges data with the BS 750 using only the diversity channel.

With the use of a band AMC channel allocation scheme proposed in the present invention, the OFDMA communication system allocates, if reception signal quality is high, a high-capacity band channel to an SS, and reports channel quality information of the allocated band channel to select a band channel having high reception quality, thereby enabling high-speed, high-capacity data transmission/reception between a BS and an SS using a high coding efficiency modulation scheme through the selected high-quality band channel.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting data through a channel set up between a subscriber station (SS) and a base station (BS) in a wireless communication system, the method comprising the steps of:

transmitting, by the BS, a channel state request (CH_STA_REQ) message to the SS for a state report request of the band AMC channel allocated to the SS;

measuring, by the SS, reception quality of each band;

generating, by the SS, a list of bands having high reception quality according to the reception quality measurements;

transmitting, by the SS, a channel state response (CH_STA_RSP) message including the generated list in response to the CH_ST_REQ message to the BS;

receiving, by the BS, the CH_STA_RSP message;

determining, by the BS, whether the BS can allocate a band AMC channel to the SS in response to the CH_STA_RSP message;

transmitting, by the BS, a band AMC indication (BAND_AMC_IND) message including information indicating whether the BS allocates the band AMC channel to the SS;

receiving, by the SS, the BAND_AMC_IND message; and transmitting, by the SS, data to the BS using at least one of a diversity channel and the band AMC channel according to the received BAND_AMC_IND message;

wherein the CH_STA_RSP message includes information on at least one band index and a Carrier-to-Interference ratio (C/I) of the band AMC channel corresponding to the at least one band index;

wherein the band AMC channel includes a plurality of bands, and each band is applied by a different modulation order and coding rate;

wherein the CH_STA_RSP message includes a reported channel type field including information on a type of a channel, a state of which the SS will report to the BS, information on a list of channels, a measured quality of each of which the SS reports to the BS, and state information of each channel included in the list; and wherein the information on the type of the channel indicates a channel used when the SS communicates with the BS, if the channel is the diversity channel the CH_STA_RSP message includes information on a Downlink Channel ID of the diversity channel and a C/I of the diversity channel, if the channel is the band AMC channel the CH_STA_RSP message includes information on each Band Index of the band AMC channel and a C/I of the band AMC channel, the band AMC channel is allocated based on a band including 6 bins, the diversity channel is allocated based on a subchannel including three tiles spread over the full subcarrier band, the band AMC channel is larger than the diversity channel in terms of areas allocated therefor, and when reception quality is high the band AMC channel can be used for transmitting or receiving large-volume data at a high speed by applying a modulation scheme having a high coding efficiency.

2. The method of claim 1, further comprising the steps of:

when it is determined that the SS no longer needs to use the band AMC channel, transmitting, by the BS, the BAND_AMC_IND message including information indicating no possibility of using a band AMC channel to the SS, and releasing the band AMC channel in use; and upon receiving the BAND_AMC_IND message, transmitting, by the SS, data to the BS using a diversity channel.

3. The method of claim 1, wherein the CH_STA_REQ message includes a channel type field including type information of a channel, a report on a state of which the BS desires to receive from the SS.

4. The method of claim 1, wherein for downlink data transmission from the BS to the SS, the BS transmits the data using a diversity channel when a size of the data is not greater than a predetermined threshold, and transmits the data using the band AMC channel when the size of the data is greater than the predetermined threshold.

5. The method of claim 1, wherein the reported channel type field includes information on a channel used when the SS communicates with the BS; and wherein the reported channel type includes a diversity channel, a band AMC channel, and a safety channel.

6. The method of claim 1, wherein the BAND_AMC_IND message includes an information field indicating one of approval and disapproval for the band AMC channel allocation request from the SS.

7. A system for allocating a band Adaptive Modulation and Coding (AMC) channel in a wireless communication system, the system comprising:

a subscriber station (SS) for receiving a channel state request (CH_STA_REQ) message for a state report request of the band AMC channel allocated to the SS from a base station (BS), measuring reception quality of each band, generating a list of bands having high reception quality according to the reception quality measurements, transmitting a channel state response (CH_STA_RSP) message including the generated list in response to the CH_STA_REQ message to the BS, receiving a response to the CH_STA_RSP message from the BS, and transitioning to a state in which the SS uses a band AMC channel, according to the response; and the BS for transmitting the CH_STA_REQ message to the SS for a state report request of the band AMC channel allocated to the SS, receiving the CH_STA_RSP message, and transmitting a band AMC indication (BAND_AMC_IND) message including band AMC channel allocation information to the SS in response to the received CH_STA_RSP message;

wherein the CH_STA_RSP message includes information on at least one band index and a Carrier-to-Interference ratio (C/I) of the band AMC channel corresponding to the at least one band index;

wherein the band AMC channel includes a plurality of bands, and each band is applied by a different modulation order and coding rate;

wherein the CH_STA_RSP message includes a channel type field representing information on a type of a channel, a state of which the SS will report to the BS, information on a list of channels, a measured quality of each of which the SS reports to the BS, and state information of each channel included in the list; and wherein the information on the type of the channel indicates a channel used when the SS communicates with the BS, if the channel is the diversity channel the CH_STA_RSP message includes information on a Downlink Channel ID of the diversity channel and a C/I of the diversity channel, if the channel is the band AMC channel the CH_STA_RSP message includes information on each Band Index of the band AMC channel and a C/I of the band AMC channel, the band AMC channel is allocated based on a band including 6 bins, the diversity channel is allocated based on a subchannel including three tiles spread over the full subcarrier band, the band AMC channel is larger than the diversity channel in terms of areas allocated therefor, and when reception quality is high the band AMC channel can be used for transmitting or receiving large-volume data at a high speed by applying a modulation scheme having a high coding efficiency.

8. The system of claim 7, wherein when it is determined that the SS no longer needs to use the band AMC channel allocated to the SS, the BS transmits the BAND_AMC_IND message including information indicating no possibility of using the band AMC channel to the SS, and releases the band AMC channel used by the SS; and wherein upon receiving the BAND_AMC_IND message, the SS transmits data to the BS using a diversity channel.

9. The system of claim 7, wherein when it is determined that the SS no longer needs to use the band AMC channel allocated to the SS, the BS transmits the BAND_AMC_IND message including information indicating no possibility of using the band AMC channel to the SS, and releases the band AMC channel used by the SS; and wherein upon receiving the BAND_AMC_IND message, the SS receives data from the BS using a diversity channel.

10. The system of claim 7, wherein the CH_STA_REQ message includes a requested channel type field including type information of a channel, a report on a state of which the BS desires to receive from the SS.

11. The system of claim 10, wherein the channel type information includes information on a channel used when the BS communicates with the SS; and wherein the channel type information represents a diversity channel, a band AMC channel, and a safety channel.

12. The system of claim 7, wherein the SS and the BS exchange data between each other using at least one of a band AMC channel and a diversity channel according to information included in the BAND_AMC_IND message.

13. The system of claim 12, wherein for downlink data transmission from the BS to the SS, the BS transmits the data using the diversity channel when a size of the data is not greater than a predetermined threshold, and transmits the data using the band AMC channel when the size of the data is greater than the predetermined threshold.

14. The system of claim 12, wherein for uplink data transmission from the SS to the BS, the SS transmits the data using the band AMC channel.

15. The system of claim 7, wherein the BAND_AMC_IND message includes an information field indicating one of approval and disapproval for the band AMC channel allocation.

* * * * *